(12) United States Patent
Paquelet et al.

(10) Patent No.: US 7,660,359 B2
(45) Date of Patent: *Feb. 9, 2010

(54) METHOD FOR DETECTING UWB PULSE SEQUENCES AND DETECTION MEANS SUITABLE FOR THIS PURPOSE

(75) Inventors: Stephane Paquelet, Rennes Cedex (FR); Bernard Uguen, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 930 days.

This patent is subject to a terminal disclaimer.

(21) Appl. No.: 10/881,526

(22) Filed: Jul. 1, 2004

(65) Prior Publication Data

US 2005/0031020 A1 Feb. 10, 2005

(30) Foreign Application Priority Data

Jul. 30, 2003 (EP) .................................. 03291901

(51) Int. Cl.
*H04L 27/00* (2006.01)
(52) U.S. Cl. ...................... 375/259; 375/238; 375/239; 375/340; 375/342
(58) Field of Classification Search ................. 375/259, 375/239, 238, 242, 340, 342
See application file for complete search history.

(56) References Cited

U.S. PATENT DOCUMENTS

| 4,764,769 | A | * | 8/1988 | Hayworth et al. | 342/50 |
| 5,666,379 | A | * | 9/1997 | Ovard et al. | 375/239 |
| 5,729,571 | A | * | 3/1998 | Park et al. | 375/149 |
| 2002/0075972 | A1 | * | 6/2002 | Richards et al. | 375/324 |
| 2004/0008763 | A1 | * | 1/2004 | Fredriksson | 375/224 |

FOREIGN PATENT DOCUMENTS

| WO | WO 01/43386 A1 | 6/2001 |
| WO | WO 01/93444 A1 | 12/2001 |

OTHER PUBLICATIONS

U.S. Appl. No. 11/436,702, filed May 19, 2006, Paquelet, et al.
U.S. Appl. No. 10/902,118, filed Jul. 30, 2004, Paquelet.
U.S. Appl. No. 10/946,249, filed Sep. 22, 2004, Paquelet et al.
U.S. Appl. No. 10/950,505, filed Sep. 28, 2004, Paquelet.
Moe Z. Win, et al. "Ultra-Wide Bandwith Time-Hopping Spread-Spectrum Impulse Radio for Wireless Multiple-Access Communications", IEEE Transactions On Communications, vol. 48, No. 4, Apr. 2000, pp. 679-691.

* cited by examiner

*Primary Examiner*—Mohammad H Ghayour
*Assistant Examiner*—Leila Malek
(74) *Attorney, Agent, or Firm*—Oblon, Spivak, McClelland, Maier & Neustadt, L.L.P.

(57) ABSTRACT

A telecommunication system including a receiver to receive a signal including a sequence of Np pulses, each pulse included in a separate time window, and each pulse enclosed within a time chip whose position within the corresponding time window is defined by a chip number that is included in a known signature; and a detector configured to detect Np pulses in each of the separate time windows by using Np detection windows, a location of the detection windows defined by the known signature, the detection windows being shorter than the separate time windows, and longer than the time chip duration of the time chips, to search an expected pulse sequence.

5 Claims, 3 Drawing Sheets

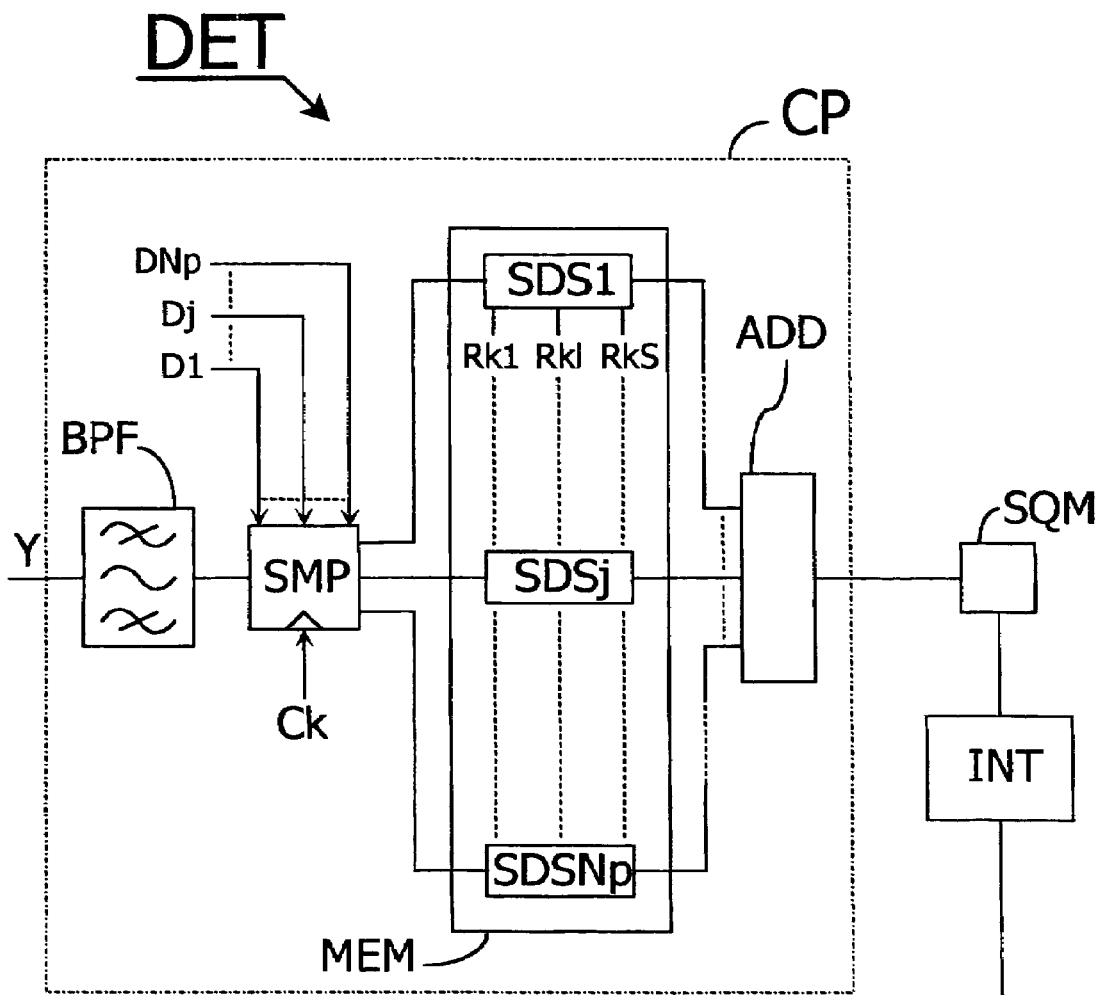
FIG.6
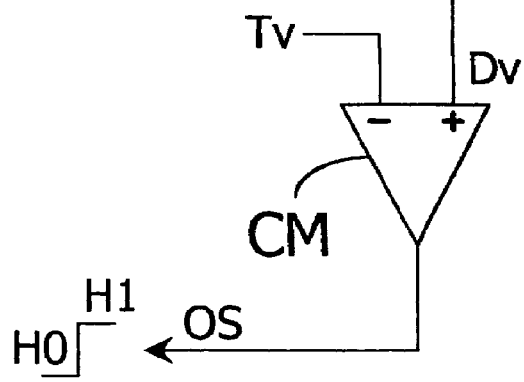

METHOD FOR DETECTING UWB PULSE SEQUENCES AND DETECTION MEANS SUITABLE FOR THIS PURPOSE

BACKGROUND OF THE INVENTION (a) Field of the Invention

The present invention relates to a method for transmitting data in a telecommunication system including at least one transmitter and one receiver, said transceiver being intended to transmit a signal formed by at least one sequence of Np pulses over Np time windows, each pulse being enclosed within a time chip whose position within its relevant time window is defined by a chip number.

(b) Brief Description of the Related Art

Such data transmission methods are currently studied with the aim of assessing the relevance of so-called Ultra-Wide Band telecommunication systems (further referred to as UWB systems). In such a system each transmitter may be identified by a signature formed by the above-mentioned chip numbers, which signature is in itself quite sturdy and may thus be reliably and accurately communicated to all potential receivers.

The pulses used in UWB systems are very short, having for example a duration lower than 0.1 nanosecond, which offers to such systems bandwidths at least as large as 10 GigaHertz, entailing high flexibility and hence numerous possible applications for such systems.

The above-described signal may form a carrying signal on which information can be encoded by modulation of said carrying signal, for example by performing phase or amplitude modulation of one or more pulse sequences.

A major problem which hinders development of such systems lies in the detection of incoming carrying signals by a receiver. In the present state of the art, signal detection is often performed by correlating a received signal delivered at the output of a receiving antenna, which received signal may be exclusively constituted by noise or, alternatively, may include an incoming carrying signal, with a gliding model of the waveform such a carrying signal should have.

Such a gliding correlation technique is not realistically applicable as such to the detection of sequences of Np pulses lasting less than 0.1 ns each and enclosed in time windows having each a width of roughly 100 ns. In such an example, with for example Np=128 and a sampling interval of 10 ps, the scanning of the whole duration of a pulse sequence would require $1,28.10^6$ successive pulse sequences for its completion and would then last 16 seconds, which is not acceptable.

It should be also be noted that, during the considerable time required for performing the detection of a pulse sequence according to the technique described above, communication conditions between the transmitter and the receiver may change, i.e. a communication channel between these devices may be altered, for example due to movements of one or both devices, so that the detection conditions may be altered in the course of a single signal detection step, with adverse effects on the accuracy of the results yielded by said signal detection step. The signal carrying the pulse sequences may even disappear before its detection is completed.

The invention aims at solving the aforementioned problems, by providing a method for transmitting data as described above, which method includes at least one signal detection step which may be carried out far more quickly than currently used signal detection techniques.

Indeed, a method for transmitting data according to the opening paragraph is characterized according to the invention in that it includes at least one signal detection step, in the course of which Np detection windows encompassing the time chips defined by the chip numbers are to be examined in search of an expected pulse sequence.

BRIEF SUMMARY OF THE INVENTION

In the detection step according to the invention, the received signal is not scanned exhaustively during the whole duration of an expected pulse sequence, as is done in the known gliding correlation technique. The scanning is instead restricted to selected portions of the expected pulse sequence. This restriction is a consequence of a difference in purpose between the detection step according to the invention and the detection steps already known in the art.

Indeed, a known detection step performed by means of a gliding correlation over the whole duration of an expected pulse sequence aims at identifying precisely the timing of the detected sequence, whereas the detection step according to the invention only aims at determining whether or not a given pulse sequence starts within a given time interval. The whole duration of a single sequence may thus be scanned stepwise, each step having a duration of the order of 10 ns in the same conditions as those described above, which means that the scanning of a duration of an expected sequence of Np=128 pulses will only require $1,28.10^3$ successive pulse sequences for its completion and would last 16 milliseconds, i.e. one thousand times less than according to the gliding correlation technique described above.

The invention thus enables to limit the processing time and power required for carrying out the detection step by only scanning detection windows defined by the signature of the transmitter, which will have been communicated beforehand to the receiver.

Various techniques may be used for examining the detection windows in search of a pulse.

According to a first embodiment of the invention, the examination of each detection window involves the computation of a detection value defined by a mean value over all detection windows of a correlation between the received signal and a series of Np expected pulse forms, which detection value is to be compared to a predetermined threshold value.

The correlation value may advantageously be raised to any given power N greater than 1 in order to increase the statistical relevance of occurrences where pulses are detected in an expected configuration.

According to a second embodiment of the invention, the examination of each detection window involves the computation of a detection value defined by a mean value over all detection windows of a squared value of a correlation between the received signal and a series of Np expected pulse forms, which detection value is to be compared to a predetermined threshold value.

As will be explained hereinafter, the use of a squared correlation value will additionally allow an easy emplementation of the computation of the detection value.

The above-mentioned predetermined threshold value will preferrably be independent of an amplitude of the received signal, in order to ensure that communication conditions such as channel attenuation have no significant impact on the outcome of the signal detection step.

According to one of its hardware-oriented aspects, the invention also relates to a telecommunication system including at least one transceiver and one receiver, said transmitter being intended to transmit a signal formed by at least one sequence of Np pulses over Np time windows, each pulse being enclosed within a time chip whose position within its relevant time window is defined by a chip number, system in which the receiver includes signal detection means intended to perform an examination of Np detection windows encompassing the time chips defined by the chip numbers in search of an expected pulse sequence.

According to a first embodiment of such a system, the detection means include computation means for computing a detection value defined by a mean value over all detection windows of a correlation between the received signal and a series of Np expected pulse forms, and comparison means for comparing said detection value to a predetermined threshold value.

According to a second embodiment of such a system, the detection means include computation means for computing a detection value defined by a mean value over all detection windows of a squared value of a correlation between the received signal and a series of Np expected pulse forms, and comparison means for comparing said detection value to a predetermined threshold value.

According to a preferred embodiment of such a system, the computation means include:
  at least one band-pass filter intended to be fed with a signal received by the receiver,
  a sampling module intended to be activated during the detection windows and to convert a signal delivered by the band-pass filter into a series of digital samples,
  memory means in which successive series of samples delivered by the sampling module are intended to be stored,
  an additionner intended to deliver a series of accumulated samples, each accumulated sample resulting from a sum of all samples having a same rank among the various series of samples stored within the memory means, and
  an integrator intended to compute a mean-square value over all detection windows of the accumulated samples delivered by the additionner, which mean-square value will constitute the detection value.

According to another of its hardware-oriented aspects, the invention also relates to a device intended to receive a signal formed by at least one sequence of Np pulses over Np time windows, each pulse being enclosed within a time chip whose position within its relevant time window is defined by a chip number, which receiver includes signal detection means intended to perform an examination of Np detection windows encompassing the time chips defined by the chip numbers in search of an expected pulse sequence.

The detection means included in such a receiver will thus be able to execute a signal detection step according to the above-described embodiments of the invention.

BRIEF DESCRIPTION OF THE SEVERAL VIEWS OF THE DRAWINGS

The characteristics of the invention mentioned above, as well as others, will emerge more clearly from a reading of the following description given in relation to the accompanying figures, amongst which:

FIG. 6 is a block diagram depicting detection means according to a preferred embodiment of the invention.

DETAILED DESCRIPTION OF THE INVENTION

Figure 1:
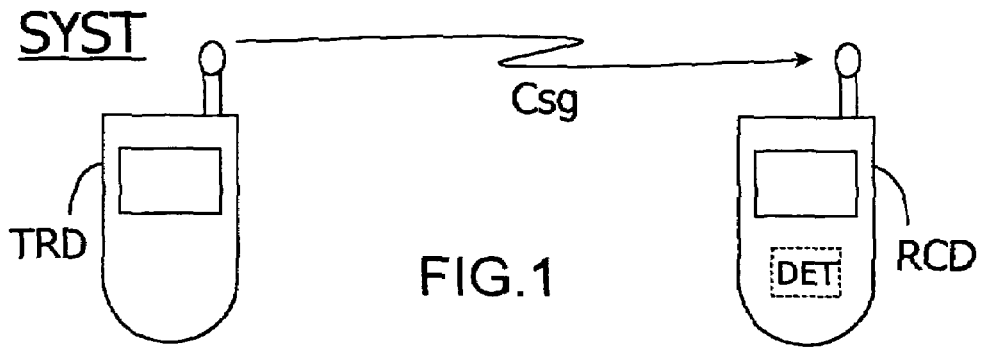
FIG. 1 is a functional diagram depicting a telecommunication system in which the invention is used.

FIG. 1 depicts a telecommunication system SYST in which the invention is embodied. This system SYST includes at least one transmitting device TRD and one receiving device RCD, which may for example be constituted by mobile phones. The transmitting device TRD is intended to transmit a signal Csg formed by at least one sequence of Np pulses pj (for j=1 to Np) over Np time windows, each pulse being enclosed within a time chip whose position within its relevant time window is defined by a chip number cj (for j=1 to Np).

The receiver REC is provided with detection means DET for detecting such an incoming signal Csg.

This signal Csg may form a carrying signal on which information can be encoded by the transmitting device TRD by means of a modulation of said carrying signal Csg, for example by performing phase or amplitude modulation of one or more pulse sequences.

Figure 2:
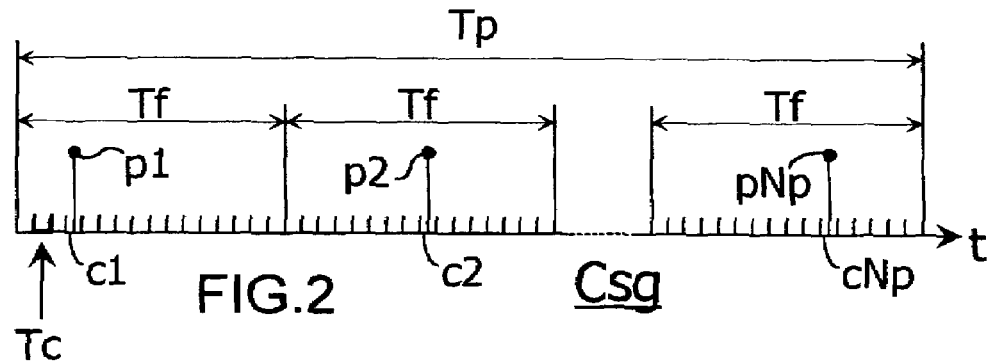
FIG. 2 is a chronogram depicting a pulse sequence constituting a carrying signal transmitted in such a telecommunication system.

FIG. 2 depicts such a carrying signal Csg in the form of a chronogram, according to which each pulse sequence has a total duration duration Tp divided into time windows having each a duration Tf, each time window being sub-devided into time chips Tc, a single time chip within each window being intended to enclose a pulse pj (for i=1 to Np), which single time chip is identified by means of a chip number cj. The transmitter of this carrying signal Csg will thus be identified by a signature $Sg=(c1, c2 \ldots cNp)$ jointly formed by all above-mentioned chip numbers cj (for i=1 to Np), which signature Sg is in itself quite sturdy and may thus be reliably and accurately communicated to all potential receivers.

Figure 3:
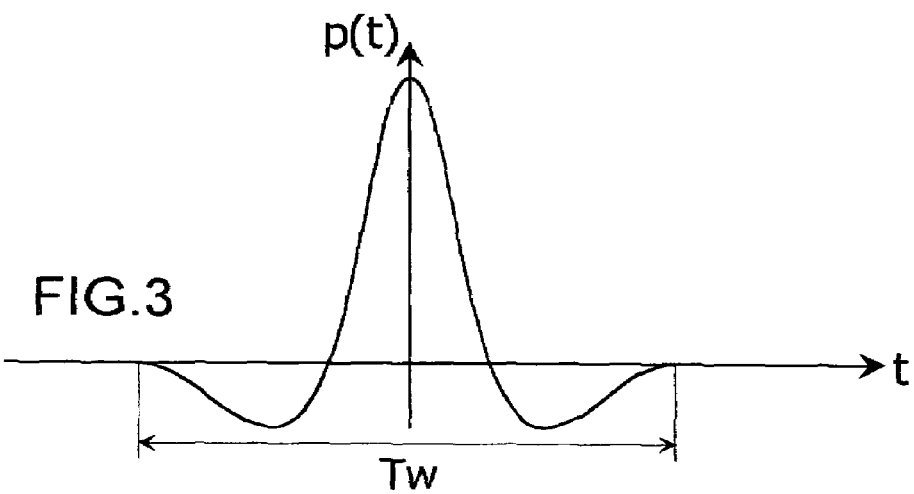
FIG. 3 is a chronogram depicting a pulse model which may be used for generating such a sequence.

FIG. 3 is another chronogram which depicts a possible shape p(t) which may be chosen for constituting the above-mentioned pulses. In the example depicted here, this pulse p(t) is defined as a derivative of the second order of a Gaussian function, which may be expressed mathematically as $p(t)=A \cdot [1-4\pi(t/Tw)^2] \cdot \exp(-2\pi(t/Tw)^2)$. Other pulse shapes known to those skilled in the art may, of course, be used in this same purpose.

Figure 4:
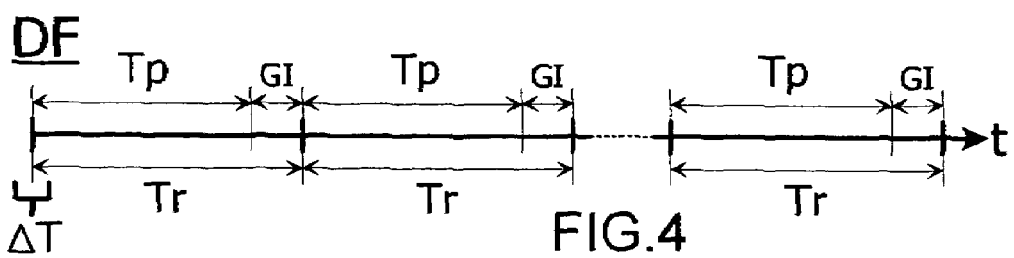
FIG. 4 is a chronogram depicting a data frame including a plurality of pulse sequences.

FIG. 4 is yet another chronogram which depicts a data frame DF formed by successive pulse sequences such as the one described above, each having a total duration Tp, a guard interval GI being periodically inserted between two such sequences in order to prevent alteration of a given sequence by a following one, which alterations could be caused, for example, by intermodulation products between said pulse sequences. This dataframe DF is thus constituted by successive frames having each a duration Tr, with $Tr=Tp+GI$, and including each a pulse sequence as described above.

A device intended to receive a data frame DF must thus be able to detect the beginning of a pulse sequence such as those described above during a given time interval ΔT.

Figure 5:
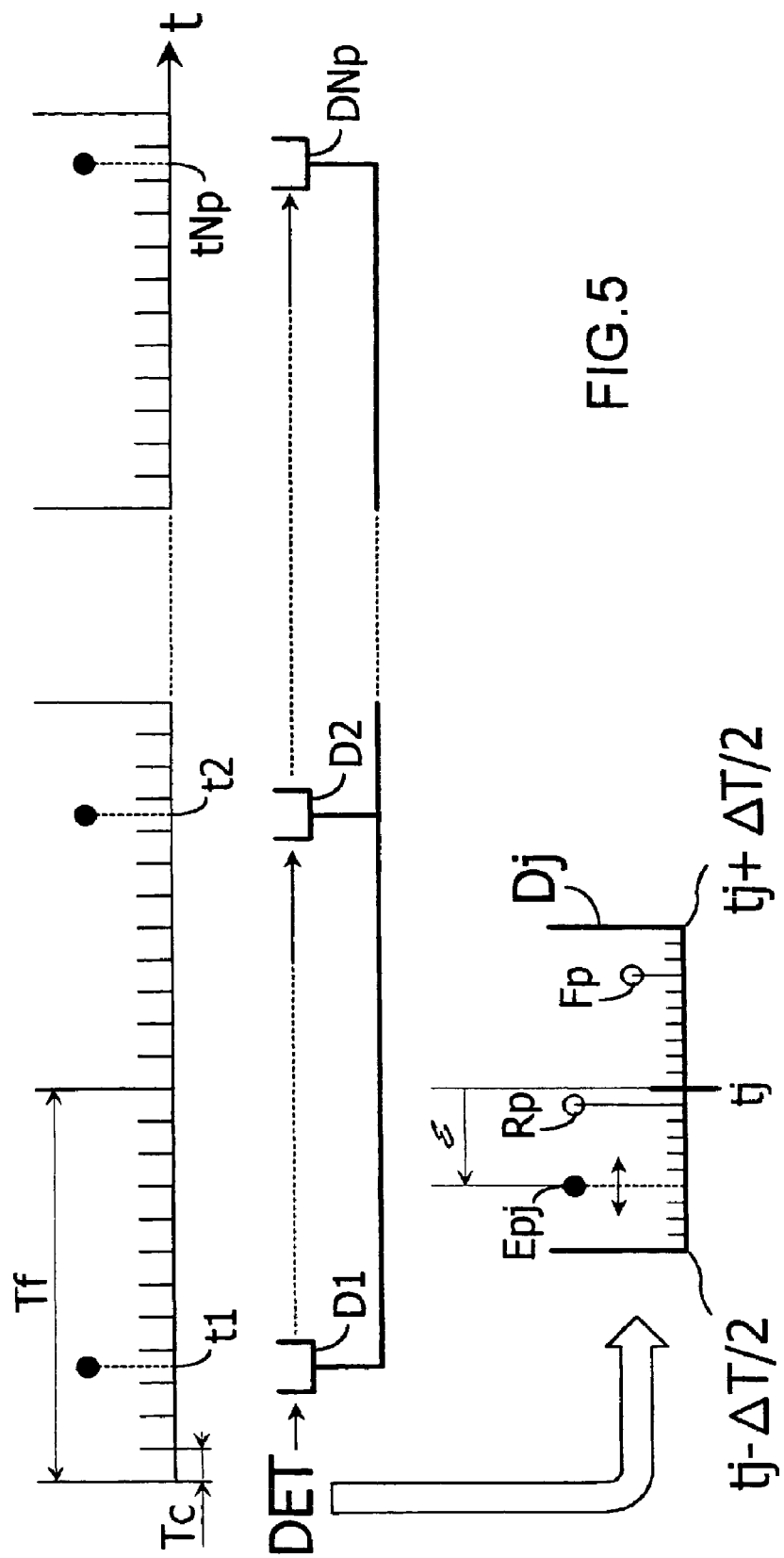
FIG. 5 is a chronogram depicting a signal detection step according to the invention.

FIG. 5 depicts how such a pulse sequence may advantageously be detected by a device intended to receive this sequence. According to the present invention, such a device will carry out a signal detection step DET in the course of which Np detection windows Dj (for j=1 to Np) encompassing the time chips defined by the chip numbers are to be examined in search of pulses belonging to an expected pulse sequence, which pulses are shown in dashed lines in this Figure. Each detection window Dj (for j=1 to Np) is wider than a single time chip duration Tc, and has a duration ΔT, which means that carrying out the detection step DET depicted here amounts to providing an answer to a problem consisting for a receiving device in determining if a pulse sequence transmitted under a known signature and intended to be received by said device has or not started during a given time interval ΔT.

The method according to the invention only requires to scan selected time windows Dj centered on moments tj (for j=1 to Np) defined by their respective associated chip numbers, in search of expected pulses.

This enables to determine in a single step if a given pulse sequence starts or not within a given time interval ΔT, whereas in the known detection technique, such a statement may only be established after performing numerous elementary correlations for achieving an exhaustive scanning of the whole duration Tp of said given sequence.

A possible way of carrying out the scanning of the detection windows Dj centered on given instants tj and defined by lower and upper bounds respectively equal to tj−ΔT/2 and tj+ΔT/2 is also shown in this Figure. In this example, a detection value defined by a mean value over all detection windows of a correlation between the received signal and a series of Np expected pulses Epj is computed. This detection value will then be compared to a predetermined threshold value.

The computation of this detection value is performed by successively shifting by an amount ε a series of Np patterns Epj representing each an expected pulse, from the lower bounds tj−ΔT/2 to the upper bounds tj+ΔT/2 of all scanned detection window Dj, and computing, for each value of ε, a scalar product between a vector representing said series of Np patterns Epj and the received signal, and accumulating the successive computed values of this scalar product, which constitutes a correlation between the received signal and the series of Np expected pulse forms Epj.

This correlation will preferably be squared so as to emphasize occurrences where a received pulse Rp is indeed present within detection window Dj, with respect to freak occurrences where a noise peak Fp may produce a significant value of the scalar product described above, the amplitude of such a noise peak being lower than that of an actually received pulse Rp.

The inventor has furthermore observed that the use of a squared correlation value also enables to simplify the emplementation of the detection step, as will now be explained.

If the above-described squared correlation is noted (y|s(.−ε))², where s and y are vectors representing the expected signal s(t) and the received signal y(t), respectively, the corresponding detection value may be expressed as a quadratic form given by:

$$Q(y) = E_\varepsilon\{(y \mid s(.-\varepsilon))^2\}$$

The received signal y(t) will be deemed corresponding to a state H1 in which y(t)=A.s(t−ε)+n(t), t belonging to [−ΔT/2; Tp+ΔT/2], if Q(y) exceeds a predetermined threshold value Tv, the received signal y(t) will be deemed corresponding to a state H0 in which y(t)=n(t) where n(t) is constituted by noise, if Q(y)<Tv.

The predetermined threshold value Tv is defined on the basis of a chosen probability of false alarm noted Pfa, which is the highest possible value for the likelihood of having Q(y)>Tv while being in state H0, y(t) then being expressed as y(t)=n(t), which allows the threshold value Tv to be independent of the amplitude of the expected or received signal.

The inventor has found that the above quadratic form may be reduced in order to ease its emplementation. Indeed, by observing that y|s(.−ε)=$^T$y.s(.−ε)=$^T$s(.−ε).y, where y and s are column matrixes, and $^T$Y the transposed row matrix of column matrix y, Q(y) may be rewritten in the form Q(y)=$^T$y.Q.y where Q is a matrix having components which do not depend on those of y.

The inventor has also observed that this matrix Q is quite hollow, and may be represented in the following form:

$$Q = \begin{bmatrix} 0 & 0 & 0 & 0 & 0 \\ 0 & M & & M & 0 \\ 0 & & & & 0 \\ 0 & M & & M & 0 \\ 0 & 0 & 0 & 0 & 0 \end{bmatrix},$$

where M is a sub-matrix which may be computed solely on the basis of the shape of the expected pulse p(t), the position of each sub-matrix M in the matrix Q being defined by the positions of the afore mentioned detection windows Dj, i.e. each sub-matrix M is centered on a point $a_{l,m}$ of the matrix Q whose coordinates in this matrix are (tl;tm), with l and m=1 to Np.

If each pulse p(t) is as described in FIG. 3, each sub-matrix M may for example be defined by $$M = E_\varepsilon\{(Tw/2)^2 p(.-\varepsilon).^T p(.-\varepsilon)\}.$$

The inventor has observed that, by applying a Gaussian reduction, the above expression of the quadratic form Q(y) may be rewritten as:

$$Q(y) = \int_{DN_p} (H * y)^2(t) dt,$$

where the symbol * indicates a convolution operation, and $$H = (\sum_j \delta_{Np-tj}) * h,$$

where h is the transfer function of a band-pass filter intended to be fed with the received signal y(t), the transfer function h of which band-pass filter will be successively delayed by tNp−tj, the impulsional response of which band-pass filter being determined on the basis of the above-described matrix M and spreading on the whole width Tw of an expected pulse p(t).

The quadratic form Q(y) may thus be written as:

$$Q(y) = \int_{-\Delta T/2}^{\Delta T/2} \left[\sum_j \delta_{-tj} * \upsilon_{|Dj}\right]^2(t) dt,$$

where υ(t)=h*y(t) and $\upsilon_{|Dj}$ indicates a restriction of the signal υ(t) to the detection window Dj.

The expression $$\sum_j \delta_{-tj} * v_{|Dj}$$

may be construed as being representative of an in-phase sum of Np slices of the output signal of the band-pass filter, which slices are centered on the detection windows Dj.

In order to compute such an in-phase sum, the Np slices may be sampled and then stored in memory means, the in-phase sum being then computed by adding together all samples of a same rank, or re-computed samples of a same rank, in cases where a pre-processing of said samples is necessary.

FIG. 6 depicts an embodiment of the detection means DET in which the computation means CP implement the above-described principles. According to this embodiment, the computation means CP include:

- at least one band-pass filter BPF intended to be fed with a signal Y received by the receiver,
- a sampling module SMP clocked by a clock signal Ck, which sampling module SMP is intended to be activated during the detection windows Dj (for j=1 to Np) and to convert a signal delivered by the band-pass filter BPF into various series SDSj of S digital samples,
- memory means MEM in which successive series SDSj (for j=1 to Np) of S samples delivered by the sampling module SMP are intended to be stored,
- an additionner ADD intended to deliver a series of S accumulated samples, each accumulated sample resulting from a sum of all samples having a same rank Rkl (for l=1 to S) among the various series SDSj (for j=1 to Np) of S samples stored within the memory means MEM, and
- an integrator INT intended to compute a mean-square value over all detection windows of the S accumulated samples delivered by the additionner ADD, which mean-square value will constitute a detection value Dv intended to be compared by the comparison means CM to a predetermined threshold value Tv.

Such an implementation is quite easy and may be done at a very low cost. If the bandwidth of the received signal Y proves to be too large to be handled as a whole by a single band-pass filter PBF, said filter may be constructed by a plurality of narrower band-pass filters arranged in parallel and covering each a subdivision of the bandwidth of the received signal Y.

The invention claimed is:

1. A telecommunication system comprising:
   a receiver configured to receive a signal including a sequence of Np pulses, each of the Np pulses is located in a separate time window, with only one of the Np pulses in each time window, and each time window includes plural time chips corresponding to plural allowed pulse locations according to a modulation scheme of the signal;
   a detector configured to detect the presence of an expected pulse sequence of Np pulses in the received signal that represents a known signature by examining only Np detection windows for the existence of a pulse, with only one of the Np detection windows in each time window, a location of the only one detection window in each time window corresponds to a location of a corresponding pulse in the expected pulse sequence of Np pulses that represents the known signature, and each detection window is shorter than a time window and longer than a time chip; and
   a processor configured to compute a correlation value between the received signal of the sequence of Np pulses and the expected pulse sequence of Np pulses, compute a detection value as a mean value over the Np detection windows of the correlation value, and compare the computed mean value to a predetermined threshold value.

2. The telecommunication system according to claim 1, wherein said processor is further configured to compute the detection value based on a mean value of Np detection windows of a squared value of the correlation.

3. The telecommunication system according to claim 1, wherein the predetermined threshold value is independent of an amplitude of the received signal.

4. The telecommunication system according to claim 1, wherein said detector is further configured to position the detection windows at time moments of their respective chip numbers of the time chip that are extracted from the known signature.

5. The telecommunication system according to claim 1, wherein the processor includes:
   a band-pass filter fed with the received signal of the sequence of Np pulses;
   a sampling module activated during a time frame of the detection windows to convert a signal arriving from the band-pass filter into a series of digital samples;
   a memory configured to store the series of digital samples from the sampling module;
   an adder configured to add all digital samples that have a same rank among the series of digital samples that are stored in the memory, to deliver a series of accumulated samples; and
   an integrator configured to compute a mean-square value over all detection windows of the accumulated samples that are delivered by the adder, the mean-square value constituting the detection value.

* * * * *